B. B. FARNHAM.
COMPENSATING DRIVING MECHANISM.
APPLICATION FILED JUNE 24, 1914.

1,134,187. Patented Apr. 6, 1915.
2 SHEETS—SHEET 1.

B. B. Farnham
Inventor

Witnesses by
Attorneys

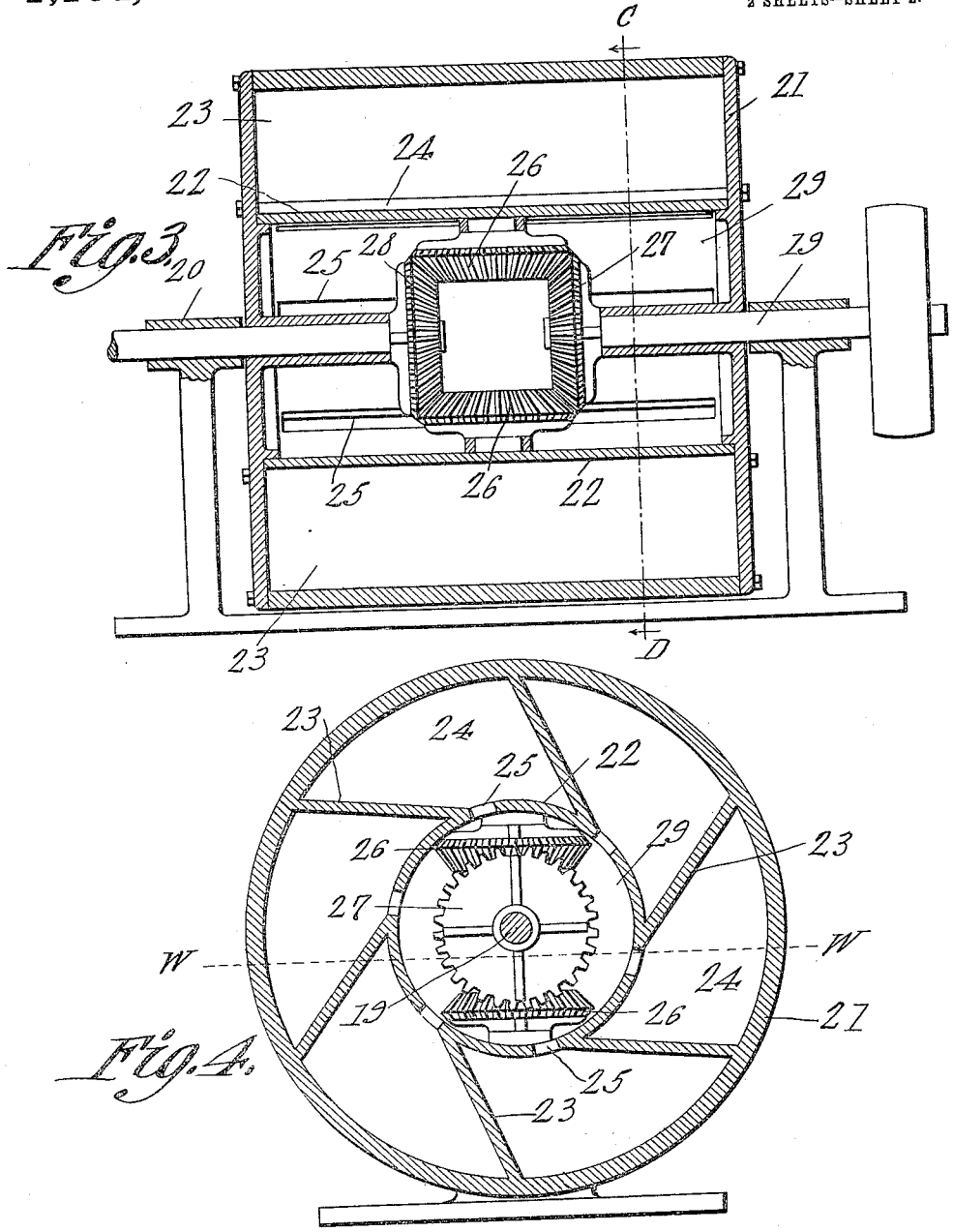

UNITED STATES PATENT OFFICE.

BION B. FARNHAM, OF BUFFALO, NEW YORK.

COMPENSATING DRIVING MECHANISM.

1,134,187. Specification of Letters Patent. Patented Apr. 6, 1915.

Application filed June 24, 1914. Serial No. 847,162.

*To all whom it may concern:*

Be it known that I, BION B. FARNHAM, a citizen of the United States, residing at Buffalo, in the county of Erie and State of New York, have invented a new and useful Compensating Driving Mechanism, of which the following is a specification.

This invention relates to compensating drive mechanism especially designed for use in paper mills in lieu of what is commonly known as the cylinder mold drive. The cylinder mold which is utilized for picking up pulp from a vat and carrying it to a web, must, in order to prevent the formation of an imperfect sheet of paper, have some means whereby the speed of the driven shaft will vary as the load thereon. Various means have been devised heretofore for effecting this result, one example of gearing for this purpose being disclosed in Patent No. 676,492, issued to me on June 18, 1901.

One of the objects of the present invention is to provide a simple form of compensating drive whereby the mechanism heretofore necessary in order to permit variation in the speed of the drive and driven parts may be had without the necessity of employing a complicated arrangement of gearing and levers.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
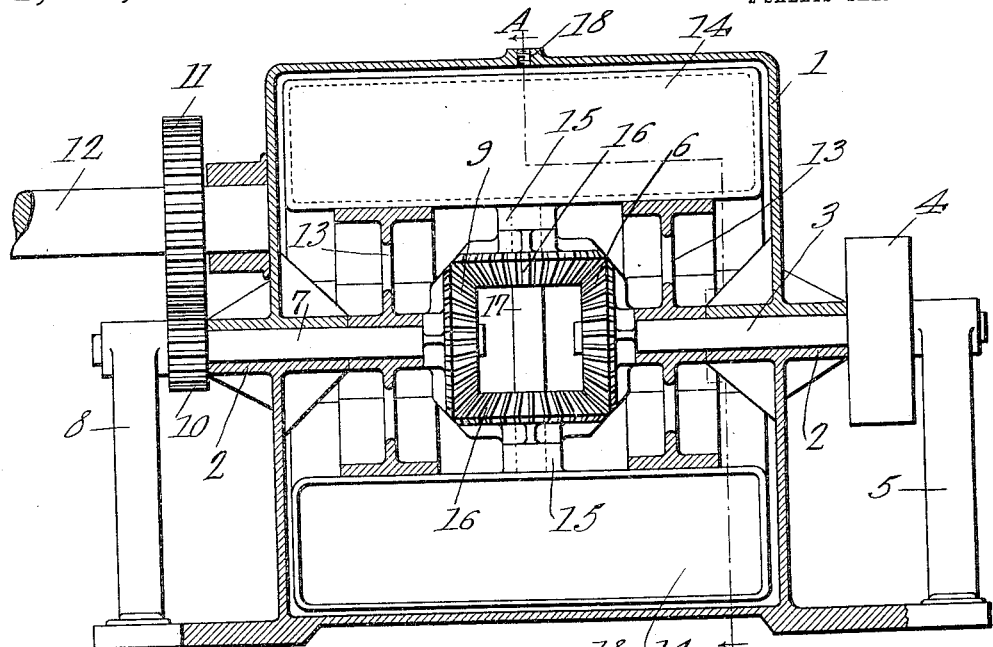
Figure 2:
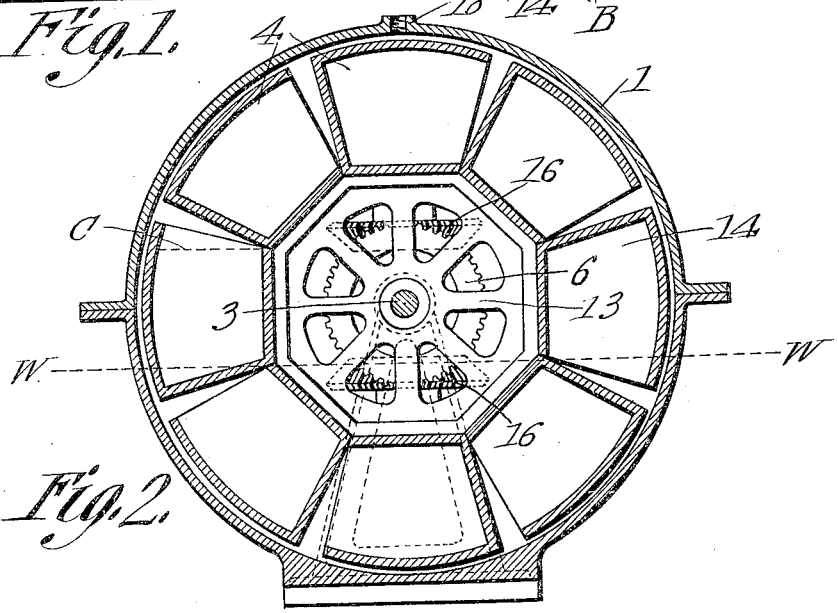

In said drawing:—Figure 1 is a central vertical longitudinal section through the compensating drive. Fig. 2 is a section on line A—B Fig. 1. Fig. 3 is a central vertical longitudinal section through a modified form of compensating drive. Fig. 4 is a section on line C—D Fig. 3.

Referring to the figures by characters of reference 1 designates a substantially cylindrical casing or housing, each end of which is provided, at its center, with a bearing 2. Journaled within one of these bearings is a drive shaft 3 which may be provided with a drive pulley 4, there being a suitable standard 5 or the like for supporting the shaft at a point outside of the housing. A bevel gear 6 is secured to the inner end of shaft 3 and is for the purpose hereinafter set forth.

Journaled within the bearing 2 is a driven shaft 7 the outer portion of which may be mounted within a standard 8 while the inner end has a bevel gear 9 similar to the gear 6. Motion may be transmitted from shaft 7 through gears 10 and 11 to a shaft 12 supported in any suitable manner.

Loosely mounted on shaft 3 between gear 6 and bearing 2 and on shaft 7 between gear 6 and adjacent bearing 2 are spiders 13 to which are secured buckets 14 which are arranged in an annular series extending practically throughout the width of the interior of housing 1 and outwardly close to the periphery of the housing. These buckets are fitted close together, as shown particularly in Fig. 2 and are so formed and mounted that, as they move downwardly within the housing 1 they will be filled with water or other liquid contained in the housing and as they move upward, they will lift quantities of the liquid until the buckets are brought successively to position directly over the gears 6 and 9 whereupon the contents thereof will pour out of the buckets and back into the lower portion of the housing 1.

Connected to two diametrically opposed buckets 14 are bearings 15 on which bevel gears 16 are loosely mounted so as to rotate freely, these bevel gears being constantly in mesh with the gears 6 and 9. As shown in Fig. 1, these gears 16 can be journaled on a shaft 17 seated at its ends within the bearings 15.

An opening 18 is provided in the top of the housing 1 through which water or other liquid can be supplied to the interior of the housing. This housing is intended to be about one-third filled as indicated by the line W in Fig. 2.

When shaft 3 is rotated, gear 6 will rotate therewith and will cause the gears 16 to rotate upon the shaft 17, thus transmitting motion to gear 9 and causing shaft 7 to revolve. As there is a slight tendency of the gears 16 to travel around the axis of the shaft 3 with the driving gear 6, the water contained within the housing 1 and which fills certain of the buckets, will practically offset this tendency, it being found that, where shaft 3 is given 100 revolutions per minute and shaft 7 is subjected to 100 pounds pull, the speed of rotation of said shaft will be reduced to 99 revolutions per minute while the buckets 14 and the gears 16 will make one-half revolution per minute about the axis of the shafts 3 and 7. During the revolution of the buckets they will pick up portions of the water contained within the housing 1 and, when the buckets complete approximately a one-quarter revolution from their lowermost positions, they will be practically filled, as shown at C in Fig. 2 whereas the buckets will gradually empty from this point until they are completely emptied upon reaching their uppermost positions. Thus the weight of the water added to the ascending buckets, will materially retard the rotation of the buckets. Should the shaft 7 be subjected to increased resistance to its rotation, shaft 3 will continue to rotate at one hundred revolutions per minute and the speed of rotation of the series of buckets within the housing will be correspondingly increased. Thus it will be seen that while shaft 3 is permitted to rotate at a uniform speed, the speed of rotation of the shafts 7 and 12 can be varied, such variation being permitted by reason of the weighted compensating connection between the two shafts 3 and 7. It has been found that the compensating drive such as herein described is especially useful in lieu of the complicated mechanism heretofore employed for driving the cylinder-mold of a paper making machine.

Instead of utilizing buckets mounted for rotation within a casing, a structure such as illustrated in Figs. 3 and 4 may be employed. In this form of device two alining shafts 19 and 20 are provided, said shafts corresponding with the shafts 3 and 7 hereinbefore referred to. A cylinder 21 is mounted for rotation on these shafts and formed within the cylinder is a concentric cylindrical partition 22 the space between this partition and the periphery of the cylinder being subdivided by partitions 23 so as to form separate buckets or compartments 24 each of which has an outlet 25 through the cylindrical partition 22. Gears 26 extend inwardly from and are adapted to rotate upon the partition 22, these gears meshing with gears 27 and 28 secured to shafts 19 and 20 respectively. Thus it will be seen that the structure provides a central compartment 29 in which the gears 26, 27 and 28 are located, this compartment being closed at its ends by the ends of the cylinder 21. The cylinder 21 is adapted to be partly filled with water, the normal water level being indicated by the line W in Fig. 4. In the operation of the device, the entire cylinder is adapted to rotate, thus causing portions of the liquid within the cylinder to be elevated and to pour out through the aperture 25 into the compartment or chamber 29 from which it will return to the lower buckets. This modified structure will operate in the same manner, under similar conditions, as the structure hereinbefore described. This modified structure of course differs from the structure first described, in that it dispenses with a liquid container such as shown at 1, the cylinder 21 constituting the liquid container in the modified structure.

What is claimed is:—

1. The combination with a drive shaft and a driven shaft, and gears upon said shafts, of a revoluble series of buckets, a liquid container housing the same, and a gear interposed between and engaging the first named gears and movable with and revoluble relative to the series of buckets.

2. The combination with a casing, a liquid contained therein, a drive shaft, a driven shaft, and gears upon the adjoining ends of the two shafts, of an annular series of buckets mounted within the housing and adapted to successively engage and elevate portions of the liquid, and a gear mounted for rotation and movable with the buckets, said gear being interposed between and engaging the first named gears.

3. The combination with a drive shaft, a driven shaft, gears secured to said shafts, and a gear interposed between and engaging the first mentioned gears, of an annular series of buckets to which the interposed gear is connected, said buckets being revoluble about the axis of the shafts successively to elevate and discharge a fluent material, there being combined inlets and outlets within the buckets.

In testimony that I claim the foregoing as my own, I have hereto affixed my signature in the presence of two witnesses.

BION B. FARNHAM.

Witnesses:
 E. L. McLaren,
 Richard Templeton.